(12) United States Patent
Reineck

(10) Patent No.: US 7,540,513 B2
(45) Date of Patent: Jun. 2, 2009

(54) ANTI-ROLL BAR AND CONTROL ARM ASSEMBLY

(75) Inventor: Benjamin R. Reineck, Waterford, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 220 days.

(21) Appl. No.: 11/257,554

(22) Filed: Oct. 25, 2005

(65) Prior Publication Data

US 2007/0090622 A1    Apr. 26, 2007

(51) Int. Cl.
*B60G 21/05*    (2006.01)
(52) U.S. Cl. .......................... 280/124.106; 280/124.116
(58) Field of Classification Search .......... 280/124.106, 280/124.149, 124.152, 124.166, 124.11, 280/124.116; 267/188, 195, 273
See application file for complete search history.

(56) References Cited

U.S. PATENT DOCUMENTS

| | | | | |
|---|---|---|---|---|
| 2,620,181 | A * | 12/1952 | Troche et al. ................ | 267/188 |
| 3,615,103 | A * | 10/1971 | Dohring et al. ....... | 280/124.128 |
| 4,203,615 | A * | 5/1980 | Cislo et al. ............ | 280/124.106 |
| 4,458,917 | A * | 7/1984 | Maru et al. ........... | 280/124.106 |
| 5,678,845 | A * | 10/1997 | Stuart .................. | 280/124.116 |
| 5,788,264 | A | 8/1998 | Adkins | |
| 6,076,840 | A | 6/2000 | Kincaid | |
| 6,116,367 | A | 9/2000 | Roberts | |
| 6,135,470 | A | 10/2000 | Dudding | |
| 6,398,451 | B1 * | 6/2002 | Zetterstrom .................. | 403/347 |
| 6,607,205 | B2 * | 8/2003 | Platner ................ | 280/124.116 |
| 6,808,035 | B1 | 10/2004 | Keeler | |
| 6,832,772 | B2 | 12/2004 | Conover | |
| 6,851,689 | B2 | 2/2005 | Dudding | |
| 6,886,840 | B2 * | 5/2005 | Reineck ............... | 280/124.107 |
| 2004/0188973 | A1 * | 9/2004 | Molitor ............... | 280/124.166 |
| 2004/0195796 | A1 | 10/2004 | Heo | |
| 2006/0255557 | A1 * | 11/2006 | Hass et al. ............ | 280/124.116 |

FOREIGN PATENT DOCUMENTS

| JP | 57-130805 | * 8/1982 |
|---|---|---|
| JP | 4-300711 | * 10/1992 |

OTHER PUBLICATIONS

Jeep Suspension Prior Art.

* cited by examiner

*Primary Examiner*—Eric Culbreth
(74) *Attorney, Agent, or Firm*—Carlson, Gaskey & Olds PC

(57) ABSTRACT

An anti-roll bar is attached directly to first and second control arms in a vehicle suspension. The anti-roll bar includes a central body portion that extends in a lateral direction, and first and second legs that extend from the central body portion in a longitudinal direction. The first and second legs are attached to inboard surfaces of the first and second control arms. The anti-roll bar is positioned such that the central body portion does not extend outwardly beyond longitudinal ends of the first and second control arms, and does not extend vertically below lower surfaces of the first and second control arms. This configuration allows the vehicle suspension to be packaged within a smaller space, and improves ground clearance.

25 Claims, 2 Drawing Sheets

ANTI-ROLL BAR AND CONTROL ARM ASSEMBLY

TECHNICAL FIELD

The subject invention relates to an anti-roll bar that is attached to first and second control arms such that the anti-roll bar is packaged within an envelope of space defined between the first and second control arms.

BACKGROUND OF THE INVENTION

Vehicle suspension systems are used to absorb road load inputs and other vibrations to provide a smooth and comfortable ride. Trailing arm or multi-link suspensions that do not have a fixed connection to an axle usually include a separate component to increase roll stiffness of the suspension to a desired level. This separate component typically comprises a stabilizer bar or anti-roll bar that provides an increased level of roll rigidity and improves steering stability.

In one example, the anti-roll bar is connected to lower control arms, which are mounted to a wheel component, such as a knuckle. The anti-roll bar is generally C-shaped with first and second legs that are each attached to one control arm. Typically, each leg is attached to the control arm with two different types of connection interfaces. A first connection interface comprises a bushing mount that couples a middle portion of each leg to a lower surface of a respective control arm. Each bushing mount includes a bushing fixed to a leg of the anti-roll bar, a bushing bracket that receives the bushing, and a plurality of fasteners that attaches the bushing bracket to the control arm. A second connection interface comprises a pin connection that fixes an end of each leg to one of the control arms.

Having two different types of connection interfaces for the anti-roll bar is expensive and time consuming from an assembly standpoint. Further, different vehicle applications can require different levels of desired roll stiffness. Thus, a common suspension may need to accommodate anti-roll bars of different size, strength, etc. If a diameter of the roll bar is increased, different bushing and bushing brackets are required, which proliferates parts.

Further, the traditional anti-roll bar configuration has the anti-roll bar extending longitudinally beyond ends of the control arms, as well as extending vertically below the control arms. This increases the overall packaging size for the vehicle suspension and reduces ground clearance, both of which are undesirable.

Thus, there is a need for an anti-roll bar with a simplified attachment interface, and which can be packaged within a smaller space, as well as overcoming the other above-mentioned deficiencies in the prior art.

SUMMARY OF THE INVENTION

An anti-roll bar is attached to first and second control arms in a vehicle suspension. The anti-roll bar is positioned within an envelope of space defined by the first and second control arms such that the anti-roll bar does not extend longitudinally beyond distal ends of the first and second control arms, and does not extend vertically below lower surfaces of the first and second control arms. This configuration allows the vehicle suspension to be packaged within a smaller space, and improves ground clearance.

The anti-roll bar has a C-shape configuration with a central body portion that extends in a lateral direction, and first and second legs that extend from the central body portion in a longitudinal direction. The first and second legs are attached directly to inboard surfaces of the first and second control arms. In one example, the first and second legs are attached to the inboard surfaces with at least one fastener, such as a bolt for example. This attachment configuration subjects the central body portion to purely torsional forces.

The first and second control arms each have a forward end and a rearward end. One of the forward and rearward ends is attached to a vehicle frame with a suspension bracket and the other of the forward and rearward ends supports a resilient mechanism for reaction between the vehicle frame and a respective one of the first and second control arms. The anti-roll bar is non-centrally located with the envelope of space between the first and second control arms, and thus is preferably positioned near one of the forward or rearward ends.

This configuration provides a compact suspension design with improved ground clearance. Further, the "bolt-on" design allows different anti-roll bars to be installed within a common vehicle suspension. Thus, anti-roll bars with different strengths or stiffnesses can be provided to "tune" the vehicle suspension to perform as needed for different applications.

These and other features of the present invention can be best understood from the following specification and drawings, the following of which is a brief description.

DETAILED DESCRIPTION OF THE PREFERRED EMBODIMENT

Figure 1:
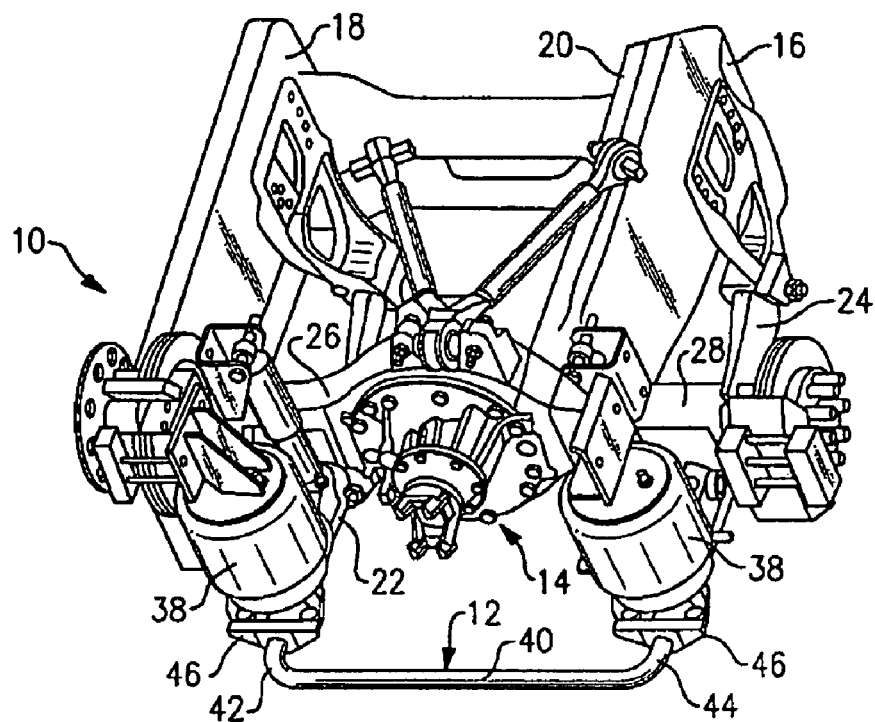
FIG. 1 is a top perspective view of a prior art vehicle suspension with an anti-roll bar.
Figure 2:
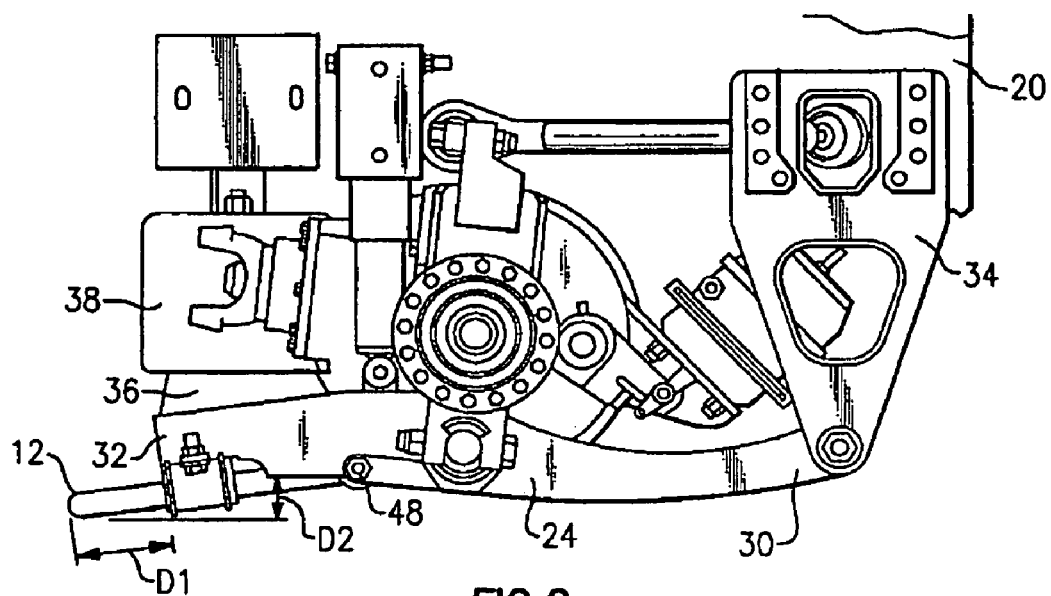
FIG. 2 is a side perspective view of the vehicle suspension with an anti-roll bar shown in FIG. 1.

FIGS. 1 and 2 show a vehicle suspension 10 with a traditional anti-roll bar 12. The vehicle suspension 10 couples an axle 14 to a vehicle frame 16. The vehicle frame 16 includes first 18 and second 20 frame members that extend longitudinally along a length of a vehicle. The vehicle suspension 10 includes first 22 and second 24 lower control arms that extend underneath first 26 and second 28 axle housing legs, respectively.

Each of the first 22 and second 24 lower control arms includes a first end 30 and a second end 32, as shown in FIG. 2. The first end 30 is attached to a respective one of the first 18 and second 20 frame members with a bracket assembly 34. Each second end 32 includes a support plate 36 that supports a resilient member, such as an air spring 38 for example. An upper portion of each air spring 38 is attached to a respective one of the first 18 and second 20 frame members.

The anti-roll bar 12 includes a central body portion 40 and first 42 and second 44 legs that extend along the first 22 and second 24 control arms, respectively. A bushing mount 46 couples each of the first 22 and second 24 legs to a lower surface of a respective one of the first 22 and second 24 control arms. A pin connection 48 connects each end of the first 42 and second 44 legs to a respective one of the first 22 and second 24 control arms.

This attachment configuration provides an anti-roll bar that extends longitudinally beyond the first 22 and second 24 control arms, and vertically below the first 22 and second 24 control arms. This is most clearly shown in FIG. 2. The anti-roll bar 12 extends longitudinally beyond the first 22 and second 24 control arms by a distance D1. The anti-roll bar 12 extends vertically below the first 22 and second 24 control arms by a distance D2. This configuration makes the vehicle suspension 10 long and lower, resulting in reduced ground clearance and increased packaging space requirements.

Figure 3:
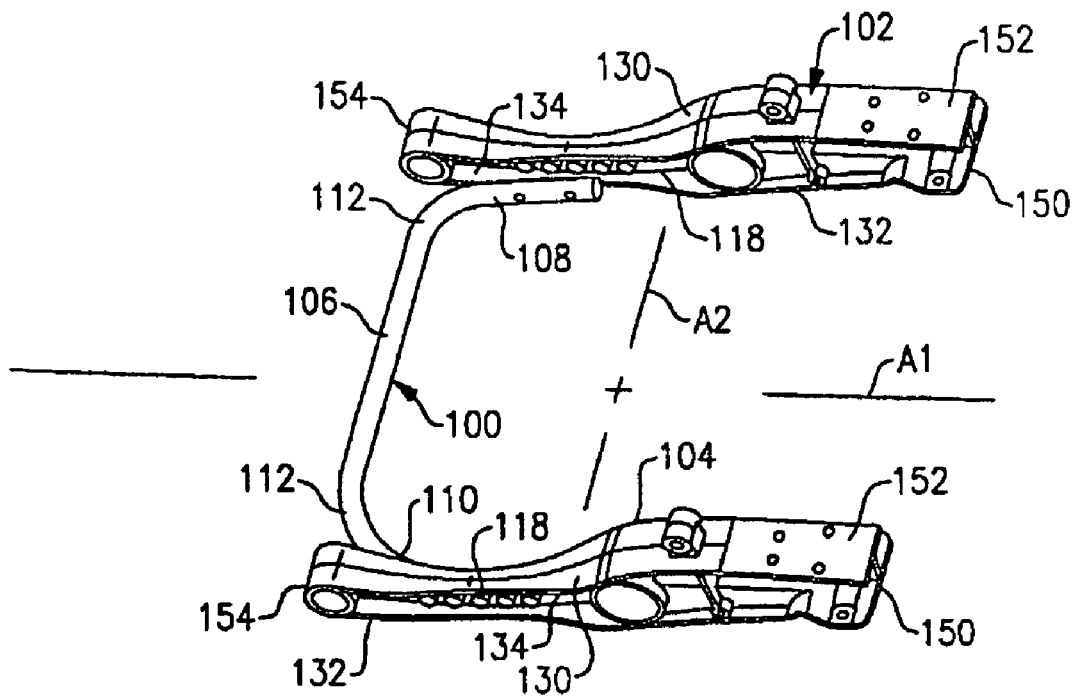
FIG. 3 is a perspective view of a vehicle suspension incorporating the subject invention.
Figure 4:
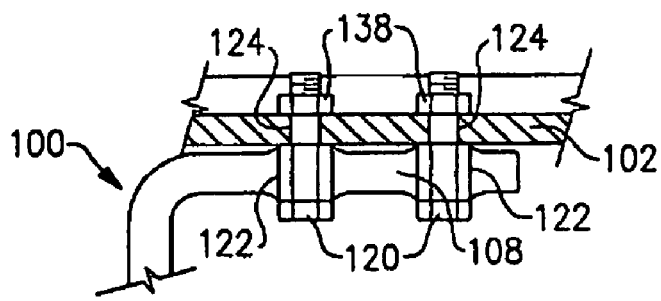
FIG. 4 is a schematic view, shown in partial cross-section, of an attachment interface between the anti-roll bar and control arm.
Figure 5:
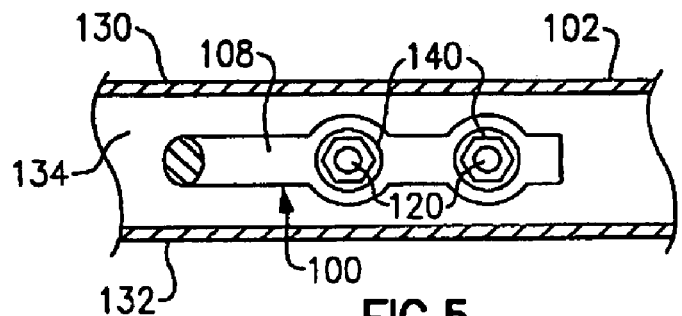
FIG. 5 is a schematic view of another type of attachment interface.

The subject invention provides an improved anti-roll bar configuration and attachment interface that is shown in FIGS. 3-5. An anti-roll bar 100 is mounted to first 102 and second 104 lower control arms. The first 102 and second 104 control arms can be utilized in a vehicle suspension 10 as shown in FIGS. 1-2, however, the inventive anti-roll bar and control arm configuration could also be used in other types of vehicle suspensions.

As shown in FIG. 3, the first 102 and second 104 control arms extend in a longitudinal direction of the vehicle adjacent first and second frame members (FIG. 1). The longitudinal direction is defined by a longitudinal axis A1 that extends along a length of the vehicle.

The anti-roll bar 100 includes a central body portion 106 that extends in a lateral direction that is transverse to the longitudinal direction. The lateral direction is defined by a lateral axis A2 that extends across a width of the vehicle. The anti-roll bar 100 also includes first 108 and second 110 legs that extend transversely to the central body portion 106. Preferably, rounded sections 112 transition between each of the first 108 and second 110 legs and the central body portion 106 to form the anti-roll bar 100 with a C-shape.

As shown in FIGS. 3-5, the anti-roll bar 100 is packaged within an envelope of space that is defined between the first 102 and second 104 control arms. As shown in FIG. 3, the anti-roll bar 100 does not extend longitudinally beyond ends of the first 102 and second 104 control arms. As shown in FIGS. 3 and 5, the anti-roll bar 100 also does not extend vertically below the first 102 and second 104 control arms. Thus, the subject invention provides a vehicle suspension that is shorter and higher than traditional configurations. This improves ground clearance and allows the vehicle suspension to be packaged within a smaller space.

The first 108 and second 110 legs are attached to inboard surfaces 118 of the first 102 and second 104 control arms. The inboard surfaces 118 face a vehicle center. Preferably, the first 108 and second 110 legs are directly attached to the inboard surfaces 118 with at least one fastener 120. In the example shown in FIG. 4, two (2) fasteners 120 are used to attach the first leg 108 to the first control arm 102. A similar connection configuration would be used for the second leg 110.

Preferably, the fasteners 120 that are secured to the inboard surfaces 118 comprise the sole attachment interface between the anti-roll bar 100 and the first 102 and second 104 control arms. It should be understood that while two fasteners are shown, only one fastener may be required, or more than two fasteners could be required, depending on the application. Additionally, other connection methods may be possible that do not require any fasteners, such as interlocking members or wedges (not shown).

The first 108 and second 110 legs include a bore 122 for each fastener 120. The bores 122 extend through the first 108 and second 110 legs in a lateral direction. Preferably, the fasteners 120 are bolts that are inserted into the bore 122 and through a corresponding bore 124 in a respective one of the first 102 and second 104 control arms.

The first 102 and second 104 control arms include an upper plate member 130, a lower plate member 132, and a vertically extending wall 134 that connects the upper 130 and lower 132 plate members. The bore 124 is formed within the vertically extending wall 134. Once the fasteners 120 are inserted through bores 122, 124, a nut 138 is threaded onto an end of the fastener 120. Optionally, as shown in FIG. 5, bushings 140 could be mounted within the bore 122 of the first 108 and second 110 legs if needed.

In the configuration shown in FIG. 3, the first 102 and second 104 control arms each include a first end 150 with a support plate portion 152 that receives an air spring 38 as shown in FIG. 1. The first 102 and second 104 control arms also include a second end 154 that extends rearwardly and is opposite of the first end 150. The anti-roll bar 100 is non-centrally located between the first 102 and second 104 control arms, i.e. the anti-roll bar 100 is positioned in a fore or aft direction near one of the first 150 and second 154 ends.

In the example shown in FIG. 3, the anti-roll bar 100 is positioned near the second end 154 with the central body portion 106 extending generally between the second ends 154 of the first 102 and second 104 control arms. The first 108 and second 110 legs extend forwardly toward the first ends 150 of the first 102 and second 104 control arms.

As shown, the central body portion 106 does not extend longitudinally beyond the second end 154 and does not extend below the first 102 and second 104 control arms (FIG. 5). This results in the anti-roll bar 100 being positioned entirely within the envelope of space defined between the first 102 and second 104 control arms. The envelope of space is defined by a lateral width extending between the inboard surfaces 118 of the first 102 and second 104 control arms, a vertical height extending from an upper surface of the upper plate member 130 to a lower surface of the lower plate member 132, and a longitudinal length of the first 102 and second 104 control arms.

The subject invention provides an anti-roll bar 100 with a simplified attachment interface compared to traditional designs. This simplified attachment interface allows different anti-roll bars to be installed within a common vehicle suspension. Thus, anti-roll bars with different strengths or stiffnesses can be provided to "tune" the vehicle suspension to perform as needed for different applications. Further, as discussed above, the simplified attachment interface reduces the amount of packaging spaced required for the vehicle suspension as well as improving ground clearance.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A vehicle suspension assembly comprising:
   a first control arm extending in a longitudinal direction;
   a second control arm laterally spaced from said first control arm and extending in the longitudinal direction; and
   an anti-roll bar including a central body portion extending in a lateral direction, and first and second legs extending from said central body portion in the longitudinal direction to form a C-shape, wherein said first leg is attached to an inboard portion of said first control arm at a first attachment interface and said second leg is attached to an inboard portion of said second control arm at a second attachment interface such that said anti-roll bar is positioned entirely within an envelope of space defined between said first and said second control arms, and wherein said first and said second attachment interfaces comprise the sole attachment interfaces for said anti-roll bar.

2. The vehicle suspension assembly according to claim 1 wherein each of said first and said second control arms extend to a distal end and wherein said central body portion does not extend longitudinally beyond said distal ends.

3. The vehicle suspension assembly according to claim 1 wherein each of said first and said second control arms includes a lower arm surface facing ground, and wherein said central body portion does not extend vertically below said lower arm surface.

4. The vehicle suspension assembly according to claim 1 wherein said first leg is directly fastened to said first control arm at said first attachment interface and said second leg is directly attached to said second control arm at said second attachment interface.

5. The vehicle suspension assembly according to claim 4 wherein said envelope of space is defined by a lateral width extending between inboard surfaces of said first and said second control arms, a vertical height extending from an upper surface to a lower surface of said first and said second control arms, and a longitudinal length extending from ends of said first and said second legs to distal ends of said first and said second control arms adjacent said central body portion.

6. The vehicle suspension assembly according to claim 1 wherein said first control arm includes a first inboard surface facing said second control arm and said second control arm includes a second inboard surface facing said first inboard surface, said first and second inboard surfaces forming said first and second attachment interfaces and wherein said first leg is fastened to said first inboard surface with at least one first fastener and said second leg is fastened to said second inboard surface with at least one second fastener.

7. The vehicle suspension assembly according to claim 6 wherein said first control arm includes a first bottom portion, a first top portion vertically spaced from said first bottom portion, and a first vertically extending wall interconnecting said first top portion to said first bottom portion, said first inboard surface being defined on said first vertically extending wall; and wherein said second control arm includes a second bottom portion, a second top portion vertically spaced from said second bottom portion, and a second vertically extending wall interconnecting said second top portion to said second bottom portion, said second inboard surface being defined on said second vertically extending wall.

8. The vehicle suspension assembly according to claim 7 wherein said anti-roll bar does not extend vertically above upper surfaces of said first and said second top portions of said first and said second control arms, and wherein said anti-roll bar does not extend vertically below lower surfaces of said first and said second bottom portions of said first and said second control arms.

9. The vehicle suspension assembly according to claim 7 wherein said first top and said first bottom portions extend longitudinally from a first control arm end to a second control arm end and wherein said second top and said second bottom portions extend longitudinally from a first control arm end to a second control arm end, and wherein each of said first control arm ends comprises a mount for a resilient member and wherein said central body portion of said anti-roll bar is positioned near said second control arm ends.

10. The vehicle suspension assembly according to claim 9 wherein said second control arm ends comprise pivot connection interfaces for connection to a vehicle structure, and wherein said central body portion is laterally aligned with said pivot connection interfaces.

11. The vehicle suspension assembly according to claim 9 wherein said mount for said resilient member comprises a spring plate that is formed as part of each of said first and said second top portions of said first and said second control arms.

12. The vehicle suspension assembly according to claim 6 wherein said at least one first fastener and said at least one second fastener comprise bolts.

13. The vehicle suspension assembly according to claim 6 wherein said at least one first and said at least one second fasteners each comprise a plurality of fasteners.

14. The vehicle suspension assembly according to claim 6 wherein said first leg includes at least one laterally extending hole for receiving said at least one first fastener, and said second leg includes at least one laterally extending hole for receiving said at least one second fastener.

15. The vehicle suspension assembly according to claim 6 wherein said first leg includes a first hole and a first bushing received within said first hole, and wherein said second leg includes a second hole and a second bushing received with said second hole, said at least one first fastener being supported within said first bushing and said at least one second fastener being supported within said second bushing.

16. The vehicle suspension assembly according to claim 1 wherein each of said first and said second control arms includes a support plate that is adapted to support an air spring that reacts between a vehicle frame and a respective one of said first and said second control arms.

17. The vehicle suspension assembly according to claim 16 wherein each support plate is positioned near a first end of said first and said second control arms and wherein said first and said second legs are attached near a second end of said first and said second control arms opposite from said first end.

18. The vehicle suspension assembly according to claim 1 including a first curved portion transitioning from said central body portion to said first leg and a second curved portion transitioning from said central body portion to said second leg.

19. The vehicle suspension assembly according to claim 18 wherein said first leg includes at least one aperture and said second leg includes at least one aperture, said at least one apertures of said first and said second legs extending in a lateral direction.

20. The vehicle suspension assembly according to claim 19 including at least one first fastener received within said at least one aperture of said first leg and at least one second fastener received within said at least one aperture of said second leg, said at least one first and said at least one second fasteners respectively securing said first and said second legs to a vertical wall of said first and said second control arms.

21. The vehicle suspension assembly according to claim 20 wherein each of said first and said second legs include an additional aperture that extends in a lateral direction, and including a third fastener and a fourth fastener received within said additional apertures, wherein said first and said third fasteners secure said first leg to said vertical wall of said first control arm and wherein said second and said fourth fasteners secure said second leg to said vertical wall of said second control arm.

22. The vehicle suspension assembly according to claim 1 wherein each of said first and said second control arms includes a first arm end with a support plate portion to receive a resilient member and a second arm end that is securable to a vehicle frame member.

23. The vehicle suspension assembly according to claim 1 wherein said first control arm includes a first upper plate member, a first lower plate member, and a first vertically extending wall that connects said first upper and said first lower plate members and wherein said first leg is attached to said first vertically extending wall such that said first upper plate member and said first lower plate member have an overlapping relationship with said first leg; and wherein said second control arm includes a second upper plate member, a second lower plate member, and a second vertically extending wall that connects said second upper and said second lower plate members and wherein said second leg is attached to said second vertically extending wall such that said second upper plate member and said second lower plate member have an overlapping relationship with said second leg.

24. The vehicle suspension assembly according to claim 1 wherein said first and said second control arms each have a first end with a support plate portion to receive a resilient member and a second end with a pivot mount portion to pivotally connect said first and said second control arms to a vehicle frame.

25. The vehicle suspension assembly according to claim 24 wherein said anti-roll bar is non-centrally located relative to said first and said second control arms in a longitudinal direction with said central body portion extending generally laterally between said second ends of said first and said second control arms with said first and said second legs extending toward said first ends of said first and said second control arms.

* * * * *

UNITED STATES PATENT AND TRADEMARK OFFICE
CERTIFICATE OF CORRECTION

PATENT NO. : 7,540,513 B2 Page 1 of 1
APPLICATION NO. : 11/257554
DATED : June 2, 2009
INVENTOR(S) : Reineck It is certified that error appears in the above-identified patent and that said Letters Patent is hereby corrected as shown below:

Claim 25, Column 8, Line 9: Replace "1ongitudinal" with "longitudinal"

Signed and Sealed this

Eighteenth Day of August, 2009

David J. Kappos
*Director of the United States Patent and Trademark Office*